United States Patent [19]

Dumont

[11] Patent Number: 4,620,980

[45] Date of Patent: Nov. 4, 1986

[54] PROCESS FOR THE CONTINUOUS CLARIFICATION OF FRESH FRUIT JUICE

[75] Inventor: Yves Dumont, Montreal, Canada

[73] Assignee: A. Lassonde & Fils Inc., Rougemont, Canada

[21] Appl. No.: 478,021

[22] Filed: Mar. 23, 1983

[30] Foreign Application Priority Data

Mar. 26, 1982 [CA] Canada ................................ 399463

[51] Int. Cl.$^4$ .......................... A23L 2/30; A23L 2/26; A23L 2/16; A23L 2/02
[52] U.S. Cl. ................................ 426/330.5; 426/422; 426/495
[58] Field of Search .............. 426/330, 330.3, 330.4, 426/330.5, 422, 423, 495, 312, 319; 210/703

[56] References Cited

U.S. PATENT DOCUMENTS

| | | | |
|---|---|---|---|
| 2,530,594 | 11/1950 | Benedict | 426/495 |
| 3,314,880 | 4/1967 | Rubin | 426/495 |
| 3,741,770 | 6/1973 | Olphen | 426/495 |
| 4,094,783 | 6/1978 | Jackson | 210/703 |
| 4,162,972 | 7/1979 | Green | 210/703 |
| 4,288,551 | 9/1981 | Gudnason et al. | 435/168 |

FOREIGN PATENT DOCUMENTS 0135916 6/1979 German Democratic Rep. ................................ 426/330.4

OTHER PUBLICATIONS

"Les Boissons de Fruits", Paul Dupaigne, Presses Universitaires de France, pp. 82–91, 1972.

*Primary Examiner*—Thomas G. Wiseman
*Assistant Examiner*—Elizabeth C. Weimar
*Attorney, Agent, or Firm*—Fleit, Jacobson, Cohn & Price

[57] ABSTRACT

This invention relates to a process for the clarification of juices and other similar beverages such as wine, beer, cider, etc. . . . which comprises a flotation stage. All known clarification processes used in the commercial production of beverages are discontinuous in that they rely on a sedimentation stage and/or require the use of expensive centrifugal equipment which require regular cleaning and maintenance. The use of the invention allows the commercial clarification of beverages without the necessity of going through a sedimentation stage or the use of centrifugal equipment. The process comprises three essential stages, i.e.: the formation of a flotable floc in the untreated beverage, the continuous introduction of the coagulated beverage in a flotation vessel, the flotation of the floc by microbubbles formed in the beverage and the continuous removal of the clarified beverage.

15 Claims, 2 Drawing Figures

PROCESS FOR THE CONTINUOUS CLARIFICATION OF FRESH FRUIT JUICE

DESCRIPTION

The present invention relates to a process for the clarification of juices and other beverages whether fermented or not, and more particularly to such a process comprising a flotation stage.

BACKGROUND OF THE INVENTION

Schematically, juices of fruits other than citrus fruits, apple juice or grape juice for example, are extracted from the fruit by using a pressing system which provides an initial juice containing a certain quantity of particles or components which are deleterious to its stability or otherwise undesirable.

The large particles, seeds, pomace, etc. are usually mechanically retained in the mesh of a sieve or perforated sheet of known screening equipment. The juice must then be clarified to render it crystal clear and thus adapted to commercial sale as a juice or concentrate.

Clarification has always been a problem area in the production of juice and more particularly in the production of apple juice. In the traditional process, after the pressing and screening stages, the juice still contains fine particles of pomace which render the juice opaque. These particles are maintained in suspension in the juice by the presence of pectin. This pectin adds a certain viscosity to the product and acts as a colloidal protector which renders sedimentation or filtration very difficult. Certain further stages are thus indispensable to obtain a clear juice, namely:

(a) an enzyme treatment lasting from between 2 to 3 hours for the purpose of reducing the viscosity of the juice by eliminating the pectin;

(b) a gelatin and tannin treatment which lasts for a number of hours for the purpose of causing the precipitation of suspended matters and their gathering to form particles of sufficient size to accelerate the natural action of gravity (flocculent precipitate); and (c) a solid separation stage using natural sedimentation, plate or drum filters on which filtering agents or diatomaceous earth are added or centrifugation.

These stages may occur with or without the addition of heat to the juice. The use of heat will however accelerate the reactions but cannot reasonably reduce them to less than 2 hours. Furthermore, this technique will, in many instances, affect the quality of the finished product.

Others use a clarification method based on the flash heating of the juice to 180° F. (82° C.) or 185° F. (85° C). The juice is then cooled and goes through the solid separation stages. This process has the aforementioned disadvantages and an additional disadvantage in that this method requires two heat treatments. After the initial flash heating and clarification, it is necessary to pasturize the juice before placing it in the containers destined to the consumers. These heat treatments may have important deleterious effects on the flavour of the finished product.

More recently, an ultra filtration technique which allows the retention of pectins and other insoluble matters without the necessity of a gelatin and tannin treatment has been successfully applied to apple juice. However, although being a continuous process, this technique has certain disadvantages with respect to the retention of aromas, the plugging and life of the required membranes.

Finally, it is often necessary to proceed with a final filtration of the juice to remove any subsisting cloudiness. Different types of filters which may be used for this purpose are well-known. Some have very fine mesh baskets others use cardboard/asbestos pads. It is also known to use cloth or metallic fabrics on which a precoat of filtering material such as cellulose, bentonite or other products which adhere to the cloth or metallic fabric while letting the juice go through with as little alteration as possible.

The major disadvantage of the traditional processes is that they are discontinuous processes. Indeed, the depectinisation, coagulation and sedimentation stages require that the juice remain undisturbed for periods which may be as long as seven (7) or eight (8) hours. Furthermore, the duration of these stages will vary considerably from batch to batch.

Even the "new" processes which are said to produce a "rapid" flocculation require more than two (2) hours.

Although flotation separators are known and used in the treatment of waste waters, this technique has been nearly completely ignored by the producers of juices and other beverages such as wine and beer.

Various attempts to develop a more efficient system have up to now failed to produce juices of commercial quality. The following publications indicate the nature of certain of these attempts:

CALVEZ Janine, BARON A., DRILLEAU J. F., 1977. Description des principaux facteurs intervenant dans la défécation des moûts de pommes. C.R. Acad. Agric., 63, 1196–1203

VIJAYALAKSMI M., PICQUE D., SEGARD E., BROUN G., DRILLEAU J. F., BARON A., CALVEZ Janine, 1978. Clarification des jus de pommes par les enzymes pectinolytiques. CR fin d'étude de contrat DGRST no 77.7.0585 et 77.7.0586, action concertée "Technologie Alimentaire et Agricole"

TRESSLER et JOSLYN, 1971. Fruit and Vegetable juice processing technology. A.V.I.

DUPAIGNE, P., 1972. Les boissons de fruits. P.U.F.

Jackson, in his U.S. Pat. No. 4,094,783 describes a contaminated liquid separator using centrifugation and flotation. This process is not destined to the production of juices or other beverages and has certain important disadvantages, namely: it necessitates a closed vessel and requires that a vigourous movement be imparted to the liquid to be treated. This process is not applicable to the continuous clarification of juices and other beverages because, in such instances, the floc is particularly delicate and would be destroyed by the excess of turbulence near the entrance of the jet of liquid to be treated in the vessel.

Green, U.S. Pat. No. 4,162,972 suggests a clarification process applicable to fruit juices. This process is based on the formation of a foam and a floc in a chamber and its flotation in a second chamber. This process is of little interest because two (2) chambers are required and because the transfer of the juice from the first chamber to the second chamber will very likely result in the destruction of the floc. Furthermore, the large bubbles required for the production of foam lowers considerably the efficiency of the system.

The present invention consists in a process for the clarification of fresh juices or other beverages. However, the process will be described more particularly in association with the clarification of apple juice. The process comprises the following phases:

(a) the rapid formation or reformation of a floc (adapted to be floated) in the juice or other beverages to be treated;

(b) the continuous introduction of coagulated beverage in a "vessel" concurrently with the introduction, in the coagulated juice or other beverage, of a neutral gas in the form of micro-bubbles capable of adhering to the floc thus allowing floc particles to regroup on the surface of the liquid;

(c) the continuous removal of the regrouped particles and the continuous recuperation of the clarified juice or other liquid.

In contrast to the classic technique (depectenisation, flocculation and sedimentation), the present invention allows the suppression, if desired, of the first stage and thus allows the juice to retain its pectin while rendering it clear and limpid. This is an important advantage as it is now recognized that a pectinized juice leaves a favourable and unctuous impression to its consumers and because an important market is developing for such products.

The present invention also results in an important decrease in the quantity of juice contained in the discarded muds. In the case of apple juice this reduction may be in the order of fifty per cent (50%) when compared to the traditional process comprising a sedimentation stage.

The invention will be better understood with the help of the following description, which relates to a non-limiting example of an embodiment of the invention reference being made to the accompanying drawings of which:

It is important to note that the following description provide mere examples and that other forms, proportions and lay-outs can be adopted without departing from the framework and scope of the present invention. The example described relates to the clarification of apple juice, but the invention is evidently not limited to such an example and is applicable to the clarification of other fruit juices and more particularly to the juices of fruits other than citrus, for example, grapes, pears, cranberries, blueberries, etc. as well as to the clarification stages in the manufacture of wines, beers, ciders and other similar beverages. This process is also useful for the clarification of carrot juice and the juice of certain other vegetables.

Figure 1:
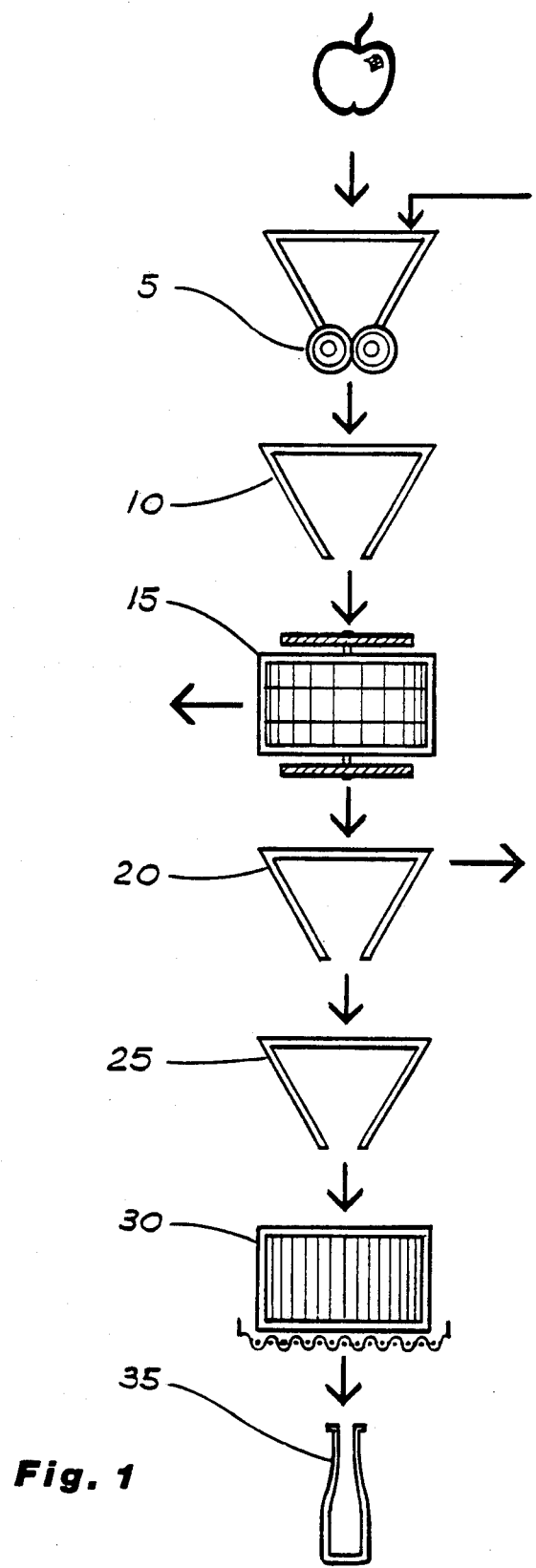
FIG. 1 is a diagram showing the different stages in the manufacture of apple juice (from the apple to the finished product)

As can be seen at FIG. 1, the apples, after having been washed, are crushed in crusher 5 and grate 10. The crushed apples are then introduced in press 15 which produces an initial juice which is itself introduced in the clarification or flotation device 20.

At the outlet of flotation device 20, the juice can, if required, be depectinised in a buffer reservoir 25. It can then be filtered by any known type of filter 30 and bottled at station 35.

It is possible to treat the muds resulting from the flotation process to recover the juice which they may contain. However such recovery is not the subject of the present invention and is thus not described.

Figure 2:
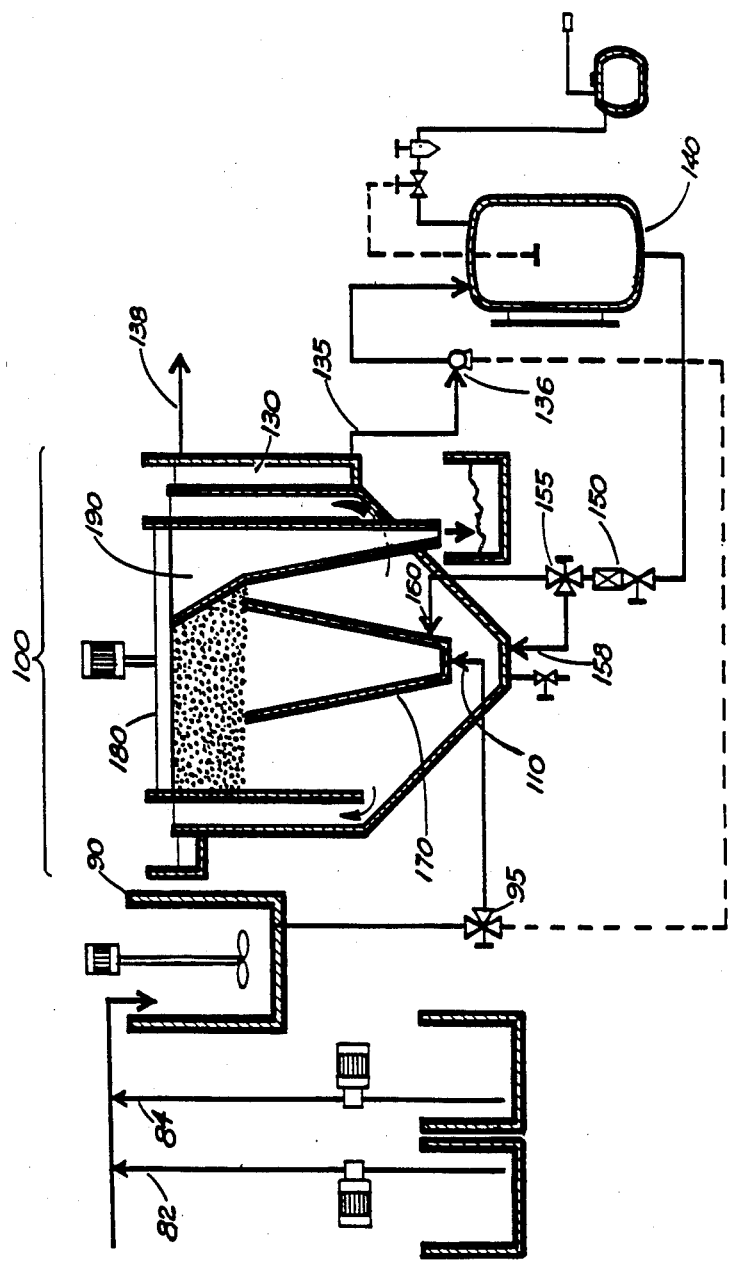
FIG. 2 is a schematic representation of a flotation device usable in association with this process.

Once the system has been initialized, as described hereunder, bentonite is injected to the initial juice at point 82 (FIG. 2). Enzymes and tannin may have been previously added to the juice. Gelatin is then injected at point 84. The resulting mixture, after a short retention in coagulator 90, is transported to entrance 110 of the injection pot 170 of flotation device 100. Clarified juice accumulates in chamber 130 of flotation device 100 and is removed to a bottling station or a filtration station via exit 138. A portion of the clarified juice is taken from exit 135 of chamber 130 and is introduced in a pressurisation chamber 140 which is used to saturate the juice with a gas. Needless to say the gas must be chosen so that it does not affect the quality of the clarified juice to an unacceptable degree. The gas saturated juice is introduced in the injection pot 170 at 160 after having passed by one (1) or more expansion valves 150. Although the description of the present embodiment refers to the pressurisation of a gas in the clarified juice, the pressurisation can also be made in non-clarified juice, in a mixture of clarified and non- clarified juice or even in water if dilution is not a problem.

Then, as can be seen in FIG. 2, the juice to be treated is introduced vertically from the center of the bottom of injection pot 170. The gas saturated clarified juice is at the same time reintroduced horizontally at 160 in pot 170 but in a non-tangential excentric direction. A floc is then formed and/or is reformed in the juice. This floc is pushed to the surface by the micro-bubbles which are formed during the gas expansion phase. It is extremely important to control the diameter of the micro-bubbles as "large" bubbles will disturb the system and diminish considerably the efficiency of the process.

Once on the surface, the floc is pushed towards exit 190 by a rake 180. It is then possible to either dispose of the removed floc or to treat it to recover the juice which it may contain.

To start up the process, valve 95 is adjusted so that the totality of the coagulated juice enters directly towards valve 136 which is itself adjusted so that the totality of the coagulated juice passes through the pressurisation chamber 140 where it is saturated with gas. The gas saturated and coagulated juice then goes through expansion valve or valves 150. Valve 155 is adjusted in such a way that the totality of the gas saturated and coagulated juice is introduced in flotation device 100 through inlet 158.

When the juice starts to accumulate in chamber 130, valves 95, 136 and 155 are simultaneously adjusted so that the regular path is established.

An apparatus which is usable with the present invention is described in canadian Pat. No. 988,226.

EXAMPLE

For a flow of 50hl/hour, a solution of 1.5% (W/V) of tannic acid is added at the rate of 0.5 liter per minute and a 1.5% (W/V) solution of gelatin is added at a rate of 0.4 to 0.6 liters per minute to the initial juice of apples from the region of Rougement, Quebec to which enzymes have been added for example, 0.5 grams/hl of enzymes sold under the trade-mark Irgazyme 100.

Once the process has been started as described above, the mixture is then continuously introduced in a coagulation device having a capacity of 250 liters with continuous agitation. The rate of flow is adjusted to obtain a retention time of a few minutes. The liquid level in the coagulation device is maintained at approximately half while the whole is agitated at a rate of approximately 40 revolutions per minute. A 1.5% (W/V) solution of bentonite is also introduced in the coagulation device at a rate of from 0.2 to 0.4 liters per minute. It is necessary to optimize the dosages of tannic acid, gelatin and bentonite in order to rapidly form a useful floc.

The coagulated juice is then introduced in a flotation device having a capacity of 12.5 hl similar to the one shown at 100 in FIG. 2. The juice to be treated is then introduced vertically from the bottom of the injection pot located in the center of the flotation device. Clarified juice is recuperated at the outlet of the flotation device. Nitrogen under a pressure of from 30 to 100 p.s.i. is then added to the clarified juice which is reintroduced in the injection pot at a rate of between 15 hl per hour to 50 hl per hour, the whole in a non-tangential excentric direction to the flow of juice to be treated. The floc which is formed and/or reformed in the injection pot is then pushed towards the surface of the flotation device by microbubbles which are formed in the injection pot at the same time as the floc.

What is claimed is:

1. Process for the continuous clarification of the juice of fresh fruits, said process comprising the steps of:
    (a) adding a coagulant to rapidly form a floc in the juice to be clarified;
    (b) continuously introducing the flocculated juice and a non-deleterious gas in the form of micro-bubbles in a flotation vessel, said micro-bubbles adhering to the floc and regrouping particles of floc on a surface of the juice;
    (c) continuously removing from said flotation vessel said particles of floc regrouped on the surface of the juice; and
    (d) continuously removing clarified juice from said flotation vessel whereby a part of the pectin of the juice is maintained in the clarified juice.

2. A process as described in claim 1, wherein said non-deleterious gas is injected under pressure in the juice before its introduction into the flotation vessel.

3. A process as described in claim 1, wherein a part of the clarified juice is recycled back to the flotation vessel and said gas is injected under pressure into the recycled juice before its introduction in the flotation vessel.

4. A process as described in claim 1, wherein said gas is nitrogen.

5. A process as described in claim 2, wherein said gas is nitrogen.

6. A process as described in claim 3, wherein said gas is nitrogen.

7. A process as described in claim 1, wherein the juice to be treated is apple juice.

8. A process as described in claim 2, wherein the juice to be treated is apple juice.

9. A process as described in claim 3, wherein the juice to be treated is apple juice.

10. A process as described in claim 1, wherein the juice to be treated is one of the following:
    (a) apple juice;
    (b) pear juice;
    (c) grape juice;
    (d) cranberry juice; and
    (e) blueberry juice.

11. A process as described in claim 2, wherein the juice to be treated is one of the following:
    (a) apple juice;
    (b) pear juice;
    (c) grape juice;
    (d) cranberry juice; and
    (e) blueberry juice.

12. A process as described in claim 3, wherein the juice to be treated is one of the following:
    (a) apple juice;
    (b) pear juice;
    (c) grape juice;
    (d) cranberry juice; and
    (e) blueberry juice.

13. A process as described in claim 1, wherein the juice is clarified at room temperature.

14. A process as described in claim 2, wherein the juice is clarified at room temperature.

15. A process as described in claim 3, wherein the juice is clarified at room temperature.

* * * * *